United States Patent
Hudzia et al.

(10) Patent No.: US 9,563,452 B2
(45) Date of Patent: Feb. 7, 2017

(54) CLOUD-ENABLED, DISTRIBUTED AND HIGH-AVAILABILITY SYSTEM WITH VIRTUAL MACHINE CHECKPOINTING

(71) Applicants: Benoit Hudzia, Belfast (GB); Steve Walsh, Belfast (GB); Roei Tell, Tel Aviv (IL); Aidan Shribman, Tel Aviv (IL); Peter Izsak, Nesher (IL)

(72) Inventors: Benoit Hudzia, Belfast (GB); Steve Walsh, Belfast (GB); Roei Tell, Tel Aviv (IL); Aidan Shribman, Tel Aviv (IL); Peter Izsak, Nesher (IL)

(73) Assignee: SAP SE, Walldorf (DE)

( * ) Notice: Subject to any disclaimer, the term of this patent is extended or adjusted under 35 U.S.C. 154(b) by 595 days.

(21) Appl. No.: 13/930,751

(22) Filed: Jun. 28, 2013

(65) Prior Publication Data

US 2015/0007172 A1    Jan. 1, 2015

(51) Int. Cl.
*G06F 9/455*   (2006.01)
*G06F 11/14*   (2006.01)
*G06F 9/48*    (2006.01)

(52) U.S. Cl.
CPC ....... *G06F 9/45533* (2013.01); *G06F 9/45558* (2013.01); *G06F 11/1448* (2013.01); *G06F 11/1458* (2013.01); *G06F 9/48* (2013.01); *G06F 2009/4557* (2013.01)

(58) Field of Classification Search
CPC .............. G06F 9/45533; G06F 9/45558; G06F 11/1448; G06F 11/1458; G06F 2009/4557; G06F 9/48
See application file for complete search history.

(56) References Cited

U.S. PATENT DOCUMENTS

| | | |
|---|---|---|
| 4,488,228 A | 12/1984 | Crudele et al. |
| 5,235,700 A | 8/1993 | Alaiwan et al. |
| 5,805,790 A | 9/1998 | Nota et al. |
| 6,035,415 A | 3/2000 | Fleming |
| 6,625,751 B1 | 9/2003 | Starovic et al. |
| 6,795,966 B1 | 9/2004 | Lim et al. |
| 6,981,114 B1 * | 12/2005 | Wu ................... G06F 11/1469 711/112 |
| 7,093,086 B1 * | 8/2006 | van Rietschote ... G06F 11/1438 711/161 |
| 7,246,200 B1 * | 7/2007 | van Rietschote ..... G06F 9/4403 709/220 |
| 7,756,943 B1 | 7/2010 | Wong |
| 7,886,294 B2 | 2/2011 | Dostert et al. |
| 7,937,618 B2 | 5/2011 | Dorai et al. |

(Continued)

*Primary Examiner* — Benjamin Wu
(74) *Attorney, Agent, or Firm* — Brake Hughes Bellermann LLP

(57) ABSTRACT

A checkpoint trigger initiating a synchronization of a first virtual machine with a second virtual machine may be received, the first virtual machine being executed with at least a first virtual processor and a second virtual processor. The first virtual processor may be paused, while the first virtual machine is allowed to continue executing, using the second virtual processor. The synchronization may be executed, including transferring memory pages of the first virtual machine for storage by the second virtual machine, and the first virtual processor may be released and execution of the first virtual machine may be resumed, using the first virtual processor and the second virtual processor.

18 Claims, 8 Drawing Sheets

(56) References Cited

U.S. PATENT DOCUMENTS

| | | | |
|---|---|---|---|
| 7,987,469 B2 | 7/2011 | Magro et al. | |
| 8,266,111 B2 | 9/2012 | Lin et al. | |
| 8,356,149 B2 * | 1/2013 | Young | G06F 9/5016 711/162 |
| 8,499,297 B2 | 7/2013 | Chen et al. | |
| 8,627,143 B2 | 1/2014 | Ranganathan et al. | |
| 8,631,406 B2 | 1/2014 | Driesen et al. | |
| 9,055,119 B2 * | 6/2015 | Zhou | H04L 67/2847 |
| 2006/0150010 A1 * | 7/2006 | Stiffler | G06F 11/1438 714/13 |
| 2009/0063749 A1 * | 3/2009 | Dow | G06F 12/08 711/6 |
| 2009/0063750 A1 * | 3/2009 | Dow | G06F 12/08 711/6 |
| 2009/0064136 A1 * | 3/2009 | Dow | G06F 9/5077 718/1 |
| 2009/0113109 A1 * | 4/2009 | Nelson | G06F 11/203 711/6 |
| 2009/0313447 A1 * | 12/2009 | Nguyen | G06F 11/1451 711/162 |
| 2010/0049929 A1 * | 2/2010 | Nagarkar | G06F 9/45533 711/162 |
| 2011/0167196 A1 * | 7/2011 | Scales | G06F 11/1438 711/6 |
| 2011/0258625 A1 * | 10/2011 | Waldspurger | G06F 11/1438 718/1 |
| 2012/0011508 A1 * | 1/2012 | Ahmad | G06F 12/1009 718/1 |
| 2013/0124475 A1 | 5/2013 | Hildenbrand et al. | |
| 2014/0215172 A1 * | 7/2014 | Tsirkin | G06F 11/203 711/162 |
| 2014/0372717 A1 * | 12/2014 | Ciu | G06F 21/53 711/162 |

* cited by examiner

CLOUD-ENABLED, DISTRIBUTED AND HIGH-AVAILABILITY SYSTEM WITH VIRTUAL MACHINE CHECKPOINTING

TECHNICAL FIELD

This description relates to memory migrations of virtual machines.

BACKGROUND

Virtual machines are software-based implementations or reproductions of the software and hardware resources of a physical computing device. For example, software known as a hypervisor may be installed and executed on a physical computing device, where such hypervisor software is operational to create, manage, relocate, or erase one or more virtual machines, using the underlying resources of the physical computing device.

For example, a hypervisor running on a physical computing device may allocate a portion of the processing, memory, and other resources of the physical computing device for the creation and execution of a first virtual machine, while allocating a remainder of the processing, memory, and other resources of the physical computing device for the creation and execution of a second virtual machine. In this way, the two virtual machines may execute simultaneously using the same underlying resources. However, the two virtual machines may operate in isolation from one another. As a result, for example, the two virtual machines may execute different operating systems, applications, network interfaces, and may generally operate independently of one another, as if the two virtual machines were two actual, separate computing devices.

Thus, the use of such virtual machines provides a great deal of flexibility in the deployment of underlying hardware resources. For example, allocations of the underlying hardware resources may be adjusted as needed over time, so as, e.g., to optimize operations of multiple virtual machines with respect to a desired task to be performed at a given point in time.

Additionally, virtual machines offer a high level of redundancy and fault tolerance. For example, it is possible to create a copy of a given virtual machine using a separate physical computing device, so that any failure of the original virtual machine may be mitigated by the availability of the previously-stored copy thereof.

In order to provide such redundancy and fault tolerance, processes have been developed for migrating (e.g., transferring a snapshot of) a virtual machine at a point in time for storage at a remote physical computing device. Then, in the event of a malfunction of the virtual machine, operations of the virtual machine may immediately recommence from the point in time at which the snapshot was taken, using the transferred, stored copy of the virtual machine.

Some such processes, sometimes referred to as checkpointing, may be implemented using a variety of known techniques. For example, one straightforward implementation is simply to pause all operations of a virtual machine to be copied, and to thereafter transfer the copy of the virtual machine to a desired location. However, when using such techniques, the virtual machine being copied becomes entirely unavailable throughout the copying process. Moreover, for very large virtual machines, the copying process may require an unacceptably long amount of time, so that, in many scenarios, such techniques are undesirable or otherwise unsatisfactory.

Attempts have been made to improve upon such processes. For example, techniques known as pre-copying techniques have been developed which seek to copy portions of a virtual machine which are unchanging or infrequently changing, while allowing the virtual machine to otherwise continue normal operations. Then, the virtual machine may eventually be paused for the purpose of copying the remaining, frequently-changing portions thereof. However, despite the availability of these and other attempted optimizations, no checkpointing techniques yet exist which provide desired levels of speed and availability, particularly for large and frequently changing virtual machines.

SUMMARY

According to one general aspect, a system may include instructions recorded on a non-transitory computer-readable medium, and executable by at least one processor. The system may include a checkpointing engine configured to cause the at least one processor to execute a synchronization of a first virtual machine with a second virtual machine, the first virtual machine being executed with at least a first virtual processor and a second virtual processor, the synchronization including transferring memory pages of the first virtual machine for storage by the second virtual machine. The checkpointing engine may include a checkpoint trigger monitor configured to cause the at least one processor to receive a checkpoint trigger initiating the synchronization, a pause manager configured to cause the at least one processor to pause the first virtual processor while allowing the first virtual machine to continue executing, using the second virtual processor, during at least a portion of the synchronization, and a page table manager configured to cause the at least one processor to track, within a page table, a page entry for each memory page of the first virtual machine, the page entries each including a write control bit and a dirty bit. The checkpointing engine may further include a dirty bit bitmap generator configured to cause the at least one processor to generate, based on the page table, a dirty bit bitmap for transmission to, and use by, the second virtual machine, the dirty bit bitmap identifying dirty memory pages of the first virtual machine altered since a most-recent synchronization, based on the corresponding dirty bits, wherein the page table manager is configured to clear the corresponding dirty bits and set corresponding write control bits for write protection, in conjunction with the generation of the dirty bit bitmap, and a copy-on-write manager configured to cause the at least one processor to detect, during the synchronization, a write request for one of the identified dirty memory pages that has not yet been transferred to the second virtual machine, and to copy the identified dirty memory page to a temporary buffer for transferring therefrom to the second virtual machine. The pause manager may be configured to release the first virtual processor and resume execution of the first virtual machine, using the first virtual processor and the second virtual processor, once all of the identified dirty memory pages have been provided to the second virtual machine.

According to another general aspect, a computer-implemented method for executing instructions stored on a computer readable storage medium may include receiving a checkpoint trigger initiating a synchronization of a first virtual machine with a second virtual machine, the first virtual machine being executed with at least a first virtual processor and a second virtual processor, and pausing the first virtual processor while allowing the first virtual machine to continue executing, using the second virtual processor. The method may further include executing the synchronization, including transferring memory pages of the first virtual machine for storage by the second virtual machine, and releasing the first virtual processor and resume execution of the first virtual machine, using the first virtual processor and the second virtual processor.

According to another general aspect, a computer program product may be tangibly embodied on a non-transitory computer-readable storage medium and may include instructions that, when executed, are configured to receive a checkpoint trigger initiating a synchronization of a first virtual machine with a second virtual machine, the first virtual machine being executed with at least a first virtual processor and a second virtual processor, and pause the first virtual processor while allowing the first virtual machine to continue executing, using the second virtual processor. The instructions, when executed, may be further configured to execute the synchronization, including transferring memory pages of the first virtual machine for storage by the second virtual machine, and release the first virtual processor and resume execution of the first virtual machine, using the first virtual processor and the second virtual processor.

The details of one or more implementations are set forth in the accompanying drawings and the description below. Other features will be apparent from the description and drawings, and from the claims.

DETAILED DESCRIPTION

Figure 1:
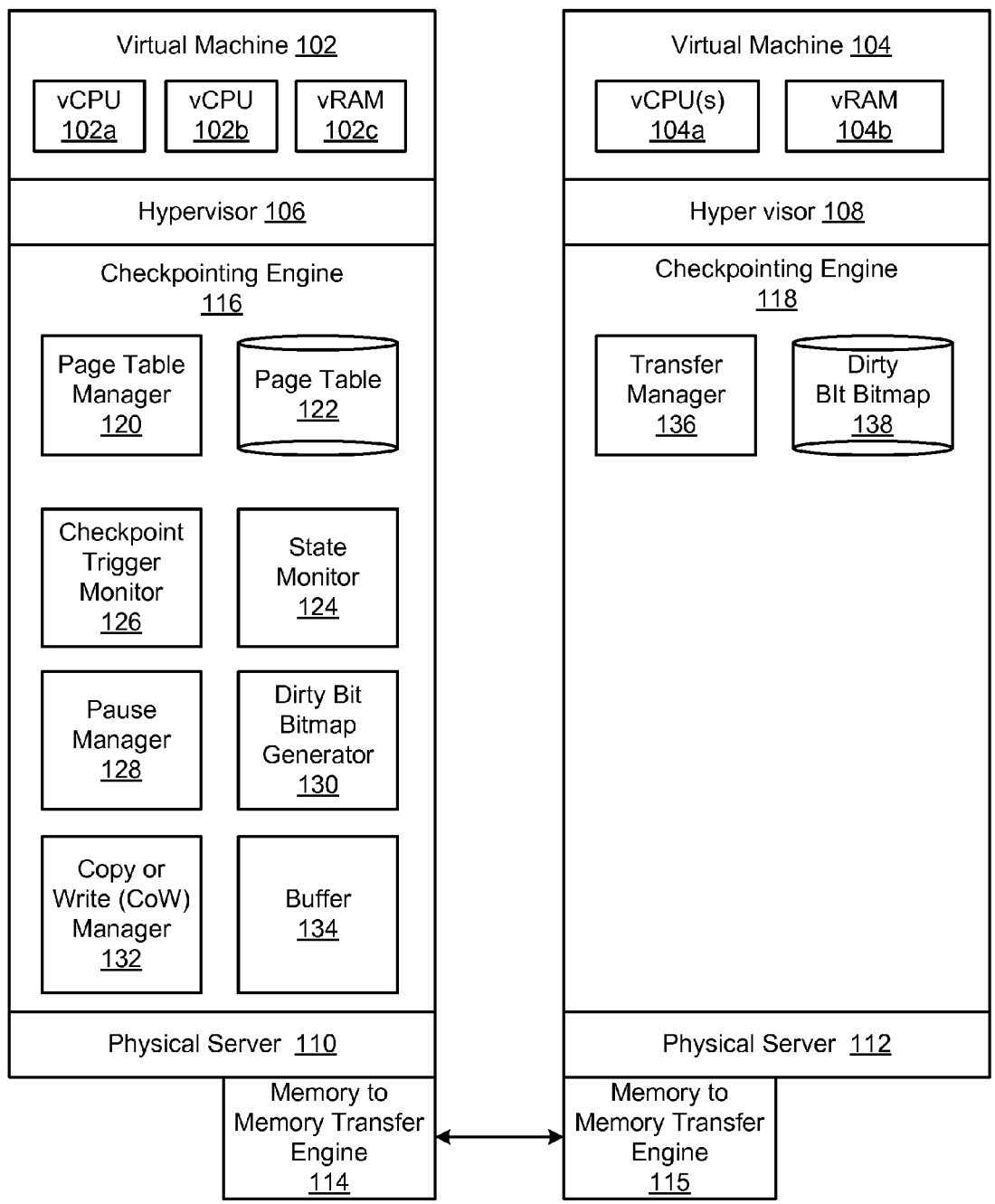
FIG. 1 is a block diagram of a distributed, high availability system with virtual machine checkpointing.

FIG. 1 is a block diagram of a distributed, high availability system 100 including virtual machine checkpointing. The system 100, as described in detail below, is operational to reproduce a virtual machine 102 at a first location, for implementation as a virtual machine 104 at a second location. As a result, as referenced above, any malfunction of the virtual machine 102 may be mitigated by the availability of the virtual machine 104, so that users of the virtual machine 102 experience a minimum of disruption in receiving whatever services are provided by the virtual machine 102. Moreover, the system 100 provides for frequent updates to the virtual machine 104, to thereby ensure availability of a relatively recent, up-to-date version of the virtual machine 102, while nonetheless requiring minimal disruptions of the operations of the virtual machine 102.

For purposes of description of the system 100 of FIG. 1, the virtual machine 102 may be understood to represent virtually any current or future implementation of virtual machine technology. Techniques for the implementation of virtual machines, as referenced above, are generally well known, and are therefore not described here in detail, except as may be necessary or helpful in understanding operations of the system 100 of FIG. 1.

Nonetheless, by way of specific example, it may be appreciated that the virtual machine 102 may represent, for example, an application server handling a large number of transaction requests, such as may occur in the context of an e-commerce website. In other example implementations, the virtual machine 102 may be utilized to implement one or more databases, such as, for example, databases used to store customer records, inventory records, financial transaction records, or any other data that might be used to support associated business applications (e.g., supply chain management (SCM) applications, enterprise resource planning (ERP) applications, or customer relationship management (CRM) systems).

In the example of FIG. 1, a hypervisor 106 may be configured to provide support for the virtual machine 102, while a hypervisor 108 may similarly be used to support operations of the virtual machine 104. That is, the hypervisor 106 may be configured to allocate resources of an underlying physical server 110 for use in creating and managing the virtual machine 102, while, similarly, the hypervisor 108 may be configured to allocate resources of a physical server 112 for implementation of the virtual machine 104.

Although the physical servers 110, 112 may be located physically proximate to one another, e.g., within a data center, the system 100 is designed to provide a cloud-friendly framework, which may thus be implemented in cloud-based environments in which the physical servers 110, 112 are remote from one another and connected by a wide-area network, such as the public internet. In this way, for example, the physical server 112 may be selected to provide the virtual machine 104 from among a potentially large pool of available physical servers, without regard for a physical proximity of the physical server 112 to the physical server 110.

Particularly in the context of such cloud-based environments, transfers of portions of the virtual machine 102 may be executed using a memory-to-memory transfer engine 114 located at the physical server 110, in communication with a memory-to-memory transfer engine 115 located at the physical server 112. For example, as described in more detail below, the memory-to-memory transfer engines 114, 116 may be implemented as remote direct memory access (RDMA) engines, which enable transparent and fast memory copying between systems, while requiring low processor utilization of the corresponding physical servers 110, 112, and while providing high bandwidth, low latency memory transfers.

Further in FIG. 1, a checkpointing engine 116 is illustrated as being implemented at the physical server 110, in conjunction with the hypervisor 106. As described in detail herein, the checkpointing engine 116 provides continuous, asynchronous checkpointing of the virtual machine 102. In other words, as described, the checkpointing engine 116 is configured to track changes to the state of the virtual machine 102 by taking incremental checkpoints of the virtual machine 102 periodically, and thereafter sending the resulting checkpoint data to a corresponding checkpointing engine 118, which, as shown, is implemented at the physical server 112 in conjunction with the hypervisor 108. In this way, as described, the checkpointing engine 118 may facilitate maintenance of the virtual machine 104 as an exact replica of the running virtual machine 102, at a time of a most-recent checkpoint.

In the example of FIG. 1, the virtual machine 102 is illustrated as including a first virtual CPU (vCPU) 102*a*, a second vCPU 102*b*, virtual random access memory (vRAM) 102*c*, and a memory management unit (MMU) 102*d*. Thus, the elements 102*a*-102*d* represents software-based implementations of corresponding, underlying hardware resources of the physical server 110. For example, the physical server 110 may include a single CPU or multiple CPUs, so that the vCPUs 102*a*, 102*b* may correspond to one or more hardware CPUs. Similarly, the vRAM 102*c* may correspond to some or all of one (or more) underlying memory of the physical server 110. The MMU 102*d* may thus represent a memory management unit corresponding to underlying memory management resources of the physical server 110.

Of course, the virtual machine 102 may include many other components or elements which correspond to underlying hardware resources of the physical server 110, but which are not explicitly illustrated and described in the context of FIG. 1. Rather, elements 102*a*-102*d* are illustrated for the purpose of describing a manner in which the checkpointing engine 116 is integrated to the MMU 102*d*, to thereby leverage a presence of the at least two vCPUs 102*a*, 102*b*. Specifically, as described in detail herein, the checkpointing engine 116 may implement the type of continuous, asynchronous checkpointing referenced above and described in detail below, at least in part by allowing the virtual machine 102 to continue normal operations using the vCPU 102*a*, even when it is required to freeze or pause the vCPU 102*b* in order to execute current operations of the checkpointing engine 116.

Specifically, as shown, the checkpointing engine 116 may include a page table manager 120, which is configured to maintain a page entry for each memory page of the virtual machine 102 within a page table 122. In this regard, it may be appreciated that the term memory page generally refers, as is known, to any defined, fixed-length contiguous block of memory of the vRAM 102*c*.

Then, the page entry for each such memory page within the page table 122 may be associated with at least two control bits, i.e., a write permission bit and a dirty bit. The write permission bit controls whether the associated page may be written to, while the dirty bit shows whether the page has been updated since a time that the dirty bit was last cleared. Specific techniques for utilizing the page entries of the page table 122, and the associated control bits just described, are provided in more detail below.

In general, it may be appreciated, however, that the page table manager 120 and the page table 122 may be utilized to identify, at a time of a current incremental checkpoint, which of the memory pages of the virtual machine 102 have not been altered since a most-recent checkpoint. Such memory pages need not be included in any associated transfers of memory pages to the virtual machine 104, since it is presumed that the virtual machine 104 already received such memory pages during a previous incremental checkpoint.

Moreover, the page table manager 120 and the page table 122, in conjunction with other components of the checkpointing engine 116 as described below, enable the checkpointing engine 116 to transfer, during a current incremental checkpoint, replicas of all memory pages which have been altered or dirtied since a time of an immediately-preceding incremental checkpoint. More specifically, as described, such dirty pages are transferred as they existed at a time of the checkpoint, so as to create the desired snapshot of the virtual machine 102 at the virtual machine 104, i.e., to replicate the virtual machine 102 as it existed at the time of the incremental checkpoint. As described, such a snapshot may be provided, even though the system 100 allows continuous operations of the virtual machine 102 (including write operations to the memory pages referenced in the page table 122) during the transfer process.

In addition to the dirty memory pages just referenced, the checkpointing engine 116 may be responsible for transferring various types of state information categorizing the virtual machine 102, as part of the checkpointing process. Consequently, a state monitor 124 may be configured to track such state information associated with the virtual machine 102. For example, such state information may include a current state of one or both of the vCPUs 102*a*, 102*b* at a time of a current incremental checkpoint. Such state information may include, for example, a current state of internal virtual registers of one or both of the vCPUs 102*a*, 102*b*, or various other operational details associated with a current execution state of a specific vCPU.

With respect to the state monitor 124, it may be appreciated that operations of the checkpointing engine 116 in executing a current incremental checkpoint may include a temporary freezing or pausing of the vCPUs 102*a*, 102*b*. Consequently, even though the various types of state information that may be monitored with respect to the vCPUs 102*a*, 102*b* may vary in accordance with specific implementations thereof, it is a relatively straightforward process for the state monitor 124 to detect, capture, and facilitate the transfer of whatever such state information exists, because the state information is not varying in time during execution of at least a portion of a specific/current incremental checkpoint. Consequently, additional example details with regard to operations of the state monitor 124 are not provided herein, except as may be necessary or helpful in understanding a manner in which the state monitor 124 facilitates inclusion of state information for the virtual machine 102 in the context of other operations of the system 100.

In addition to the transfer of dirtied memory pages and current state information, execution of a current incremental checkpoint by the checkpointing engine 116 may include identification and transfer of relevant input/output (I/O) operations of the virtual machine 102. In this regard, it may be appreciated such I/O operations may generally refer to any communication between one or more of the vCPUs 102*a*, 102*b* and any external element. For example, such an I/O operation may be executed when the vCPU 102*b* executes an operation to store data using an external memory. In other examples, such I/O operations may include any communication from, e.g., the vCPU 102*b* to any human interface (e.g., keyword/mouse, monitors, and/or printers) or communications sent to external devices used to facilitate network communications. Of course, many different types of such I/O operations are well known, and may vary depending on aspects of specific implementations of the virtual machine 102. Consequently, a nature and type of such I/O operations are not described here in detail, except as necessary or helpful in understanding operations of the system 100.

Specifically, in example implementations, a checkpoint trigger monitor 126 may be configured to detect and utilize such I/O operations as triggers for initiating a new/current incremental checkpoint. Of course, other checkpoint triggers may additionally or alternatively be used. For example, the checkpoint trigger monitor 126 may detect passage of a pre-defined measure of time, which may also serve as a trigger for initiation of an execution of a current incremental checkpoint.

For example, as described and illustrated in detail below with respect to FIGS. 3, 4, 5, the checkpoint trigger monitor 126 may initially detect an I/O operation of the vCPU 102*b*, and may thereafter initiate an incremental checkpoint based thereon. As a result, a pause manager 128 may be configured to pause operations of both the vCPUs 102*a*, 102*b* during preliminary operations of the current incremental checkpoint, and to thereafter maintain the pause/freeze of the vCPU 102*b*, while allowing operations of the virtual machine 102 to continue, using the vCPU 102*a*, during a remainder of the current incremental checkpoint.

In the following description of FIG. 1, and generally with respect to FIGS. 2-5, simplified examples are provided in which, as just referenced, the pause manager 128 is configured to pause the vCPU 102*b* for implementation of a current incremental checkpoint, while allowing operations of the virtual machine 102 to continue using the vCPU 102*a*. Such simplified examples are designed to illustrate basic concepts of operations of the system 100. However, it may be appreciated that such concepts may be extended in the context of various additional or alternative operations of the system 100. For example, in some scenarios, it may be necessary for the pause manager 128 to at least temporarily pause both of the vCPUs 102*a*, 102*b* during a current incremental checkpoint (such as when the two vCPUs execute overlapping I/O operations). Example operations of the system 100 in this regard are provided below with respect to FIG. 6. Additionally, or alternatively, it may occur that the virtual machine 102 may be implemented using three or more vCPUs. Consequently, it may occur that the pause manager 128 may be configured to pause any two or more of the available vCPUs, while allowing operations of the virtual machine 102 to continue using any currently-operational vCPUs that may be remaining Examples of operations of the checkpointing engine 116 in this regard are provided below, e.g., with respect to FIG. 7.

Thus, it may be observed that operations of the checkpointing engine 116 are highly flexible and scalable, and may accommodate many different variations of implementations of the virtual machine 102. Specifically, the checkpointing engine 116 provides the described continuous, asynchronous checkpointing techniques which enable fast, reliable checkpointing, even for very large and write-intensive virtual machines, and even in the types of cloud-based environments referenced above, which may otherwise be associated with high latencies and large amounts of network throughput.

In operation, in response to detection of a checkpoint trigger by the checkpoint trigger monitor 126 (e.g., a checkpoint trigger such as an I/O operation of the vCPU 102*b*), the pause manager 128 may proceed to pause both vCPUs 102*a*, 102*b*. Then a dirty bit bitmap generator 130 may be configured to leverage information stored within the page entries of the page table 122, as described above. Specifically, as described, each page entry includes at least two control bits, i.e., a write permission control bit and a dirty bit. As described, a dirty bit for an associated page entry of a memory page indicates whether the associated memory page has been altered since a most-recent checkpoint. Thus, by scanning the page table 122, the dirty bit bitmap generator 130 may provide a bitmap or other representation which defines and identifies such dirty pages.

To proceed with execution of the current incremental checkpoint, the checkpointing engine 116 may provide a resulting dirty bit bitmap to the checkpointing engine 118, for storage as the illustrated dirty bit bitmap 138. In conjunction with such a transfer, the checkpointing engine 116 may provide associated state information collected by the state monitor 124, as well as, if applicable, I/O logs characterizing I/O operations that are detected by the checkpoint trigger monitor 126.

By virtue of having access to the dirty bit bitmap 138, the checkpointing engine 118 is made aware of all memory pages which have been altered or otherwise dirtied since a most-recent incremental checkpoint, which, by definition, are those memory pages which are required to be transferred for inclusion within the virtual machine 104, to thereby ensure that the virtual machine 104 is an exact replica of the virtual machine 102 at a time of commencement of the current incremental checkpoint. Thus, it may be observed that a transfer manager 136 of the checkpointing engine 118 may be enabled to commence transfer of thus-identified dirtied memory pages from the virtual machine 102, utilizing the memory-to-memory transfer engines 114, 115. In other words, inclusion of the dirty bit bitmap 138 of the checkpointing engine 118 enables initiation and execution of the transfer process by the checkpointing engine 118.

Consequently, the transfer manager 136 may commence transferring identified dirtied memory pages. In this regard, it may be observed that it is possible for the transfer manager 136 to simply proceed with executing the transfer of all identified, dirtied memory pages, so as to thereby complete an updating of the virtual machine 104. However, such an approach would likely result in an undesirable or unacceptable delay of operations of the virtual machine 102, while the transfer is completed.

In the system 100 of FIG. 1, however, as reference above and described in detail herein, the pause manager 128 may be configured to release the vCPU 102*a*, while maintaining the vCPU 102*b* in a paused state. In this regard, it may be appreciated that such continuing operations of the virtual machine 102 may include write operations to memory pages represented by page entries within the page table 122. In other words, a current incremental checkpoint involves parallel operations of the transfer manager 136 and the virtual machine 102, in which the transfer manager 136 seeks to transfer dirtied pages identified by the dirty bit bitmap 138, while the virtual machine 102 is simultaneously executing operations that may further alter the identified dirtied pages.

During such parallel operations, if the transfer manager 136 transfers a dirtied memory page identified by the dirty bit bitmap 138 before the identified dirtied page is further altered by the ongoing operations of the virtual machine 102, then it may be observed that the transfer manager 136 has achieved its goal of obtaining the dirtied memory page for use in replicating the virtual machine 102 at a time of the incremental checkpoint currently being executed. If, however, the transfer manager 136 were to transfer an identified, dirtied memory page that has been further altered or dirtied since the time of creation of the dirty bit bitmap 138 (i.e., due to the ongoing, parallel operations of the virtual machine 102), then the transfer manager 136 would incorrectly include such a further-altered memory page within the virtual machine 104.

In order to avoid such scenarios, and to ensure that the virtual machine 104 is an exact replica of the snapshot of the virtual machine 102 taken at a time of commencement of the current incremental checkpoint, a copy-on-write (CoW) manager 132 may be configured to ensure that all memory pages transferred to the checkpointing engine 118 by the transfer manager 136 are dirtied memory pages that existed at a time of the snapshot taken of the virtual machine 102. Specifically, the copy-on-write manager 132 may be configured to store a copy of any dirtied page identified by the dirty bit bitmap generator 130, using a buffer 134, whenever the copy-on-write manager 132 determines that the relevant dirtied page has not yet been transferred by the transfer manager 136, and yet is about to be altered (e.g., written to) by the ongoing operations of the virtual machine 102.

In order to facilitate these operations of the copy-on-write manager 132, the page table manager 120, in conjunction with creation of the dirty bit bitmap generator 130, may be configured to alter the page table 122 in a manner which provides necessary information to the copy-on-write manager 132. Specifically, during normal operations of the virtual machine 102 (i.e., operations of the virtual machine 102 that occur in between the incremental checkpoints described herein), the page table manager 120 may ensure the page entries of the page table 122 are set such that write control bits permit write operations to corresponding memory pages, while the corresponding dirty bits are updated whenever a write or other change to a given memory page is detected.

Upon generation of the dirty bit bitmap 138 by the dirty bit bitmap generator 130, however, the page table manager 120 may be configured to clear, within the page table 122, all the dirty bits of the dirtied pages identified within the dirty bit bitmap 138, while simultaneously setting the write control bits of those same pages to provide write protection thereof. Afterwards, it may be observed that the checkpointing engine 118 and the transfer manager 136 can identify dirtied memory pages to be transferred, using the dirty bit bitmap 138, even though the actual dirty bits of the page table 122 have been cleared. Moreover, the copy-on-write manager 132 may also be aware of which page entries within the page table 122 correspond to dirtied memory pages, by observing which such page entries are write-protected.

Thus, during a current incremental checkpoint, the transfer manager 136 may commence transfer of dirtied pages identified by the dirty bit bitmap 138, using the memory-to-memory transfer engines 114, 115. In so doing, and notwithstanding the continuing operations of the virtual machine 102 using the vCPU 102a, it is theoretically possible that the transfer manager 136 may simply precede to transfer all such identified dirtied memory pages, and may, in such hypothetical scenarios, precede to complete the update to the virtual machine 104 accordingly. In practice, however, and particularly in the types of write-intensive operations envisioned to be executed by the virtual machine 102 in the context of operations of the system 100, the transfer manager 136 will not be able to complete an entirety of the transfer of the dirtied memory pages identified within the dirty bit bitmap 138 prior to a time that the continuing operations of the virtual machine 102 result in an attempted write to one of the identified dirtied memory pages.

At such time, the copy-on-write manager 132 will be made aware of the attempted write operation, by virtue of the fact that the attempted write operation will temporarily be blocked by the above-referenced setting of the write control bit of the corresponding page entry within the page table 122. In response, as referenced, the copy-on-write manager 132 may immediately copy the relevant memory page to the buffer 134. Thereafter, the copy-on-write manager 132 may instruct the page table manager 120 to release the write control bit of the page entry of the associated memory page, whereupon the write operation specified by the virtual machine 102 may proceed. Then, by transferring all memory pages within the buffer 134, the transfer manager 136 may be ensured of obtaining all memory pages necessary to update the virtual machine 104.

Figure 2:
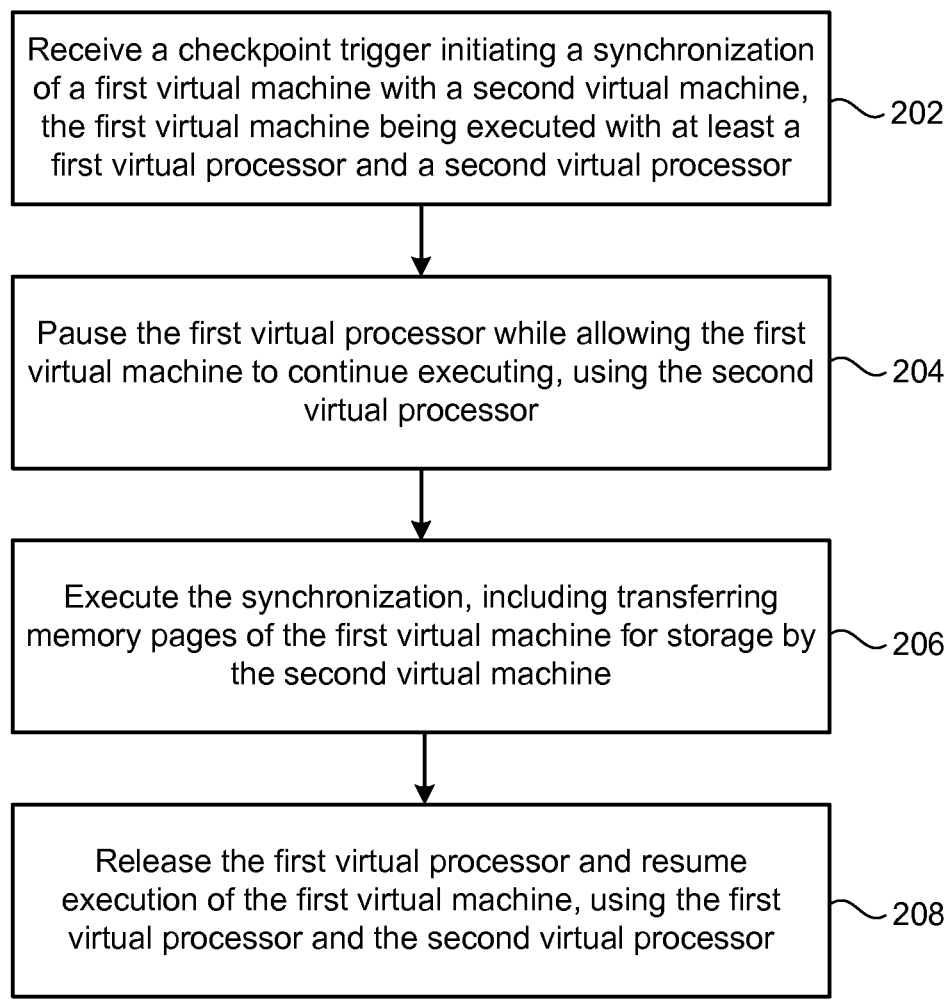
FIG. 2 is a flowchart illustrating example operations of the system of FIG. 1.

FIG. 2 is a flowchart 200 illustrating a high level, basic operational flow of the system 100. That is, the flowchart 200 illustrates a simplified operational flow, in which operations 202-208 are illustrated a separate, sequential operations. It may be appreciated, however, as described and illustrated below with respect to FIGS. 3-8, that many additional or alternative operations and operational flows should be considered to be included or considered by the simplified operational flow of the flowchart 200. For example, it may be appreciated that any two or more of the various operations may be executed in a partially or completely overlapping or parallel manner, or in a nested, iterative, branched, or looped fashion. Further, additional operations or sub-operations may be included, various alternative operations or sub-operations may be substituted, and one or more of the operations may be omitted, for purposes of a desired implementation of the system 100.

Thus, in the example of FIG. 2, a checkpoint trigger initiating a synchronization of a first virtual machine with a second virtual machine may be received, the first virtual machine being executed with at least a first virtual processor and a second virtual processor (202). For example, the checkpoint trigger monitor 126 may be configured to detect an I/O operation of the vCPU 102b as an example of the checkpoint trigger. As referenced, however, other checkpoint triggers may be used, e.g., passage of a pre-defined amount of time since a most-recent incremental checkpoint.

The first virtual processor may be paused, while the first virtual machine is allowed to continue executing, using the second virtual processor (204). For example, the pause manager 128 may be configured to freeze the vCPU 102b, while the virtual machine 102 continues to execute using the vCPU 102a. Of course, as referenced above and described in more detail below, additional operations or sub-operations may be associated with one or both of the operations 202, 204. For example, as referenced, the pause manager 128 may initially be required to pause both of the vCPUs 102a, 102b in response to the checkpoint trigger, so as to transfer, in the example of FIG. 1, state information from the state monitor 124, a dirty bit bitmap 138 from the dirty bit bitmap generator 130, and the recorded I/O operation serving as the checkpoint trigger. Further, there may be times during execution of a current incremental checkpoint that the pause manager 128 is required to pause the vCPU 102a in addition to the vCPU 102b, such as when the checkpoint trigger monitor 126 detects transmission of an I/O operation of the vCPU 102a (thereby initiating a nested checkpointing sub-process that occurs during the current checkpoint, as described below with respect to FIG. 6). Again, all such variations of implementations of the system 100 of FIG. 1 should be considered to be contemplated or included within the context of the simplified, basic operational flow of FIG. 2.

Thus, the synchronization may be executed, including transferring memory pages of the first virtual machine for access by the second virtual machine (206). For example, as described above, the checkpointing engine 116 may respond to requests from the transfer manager 136 for transfer of identified memory pages to the checkpointing engine 118, for storage in the context of the virtual machine 104. In additional or alternative examples, however, and as described below with respect to FIG. 8, at least a portion of the transfer memory pages may be transferred to an external memory pool, from which the checkpointing engine 118 may access identified memory pages as needed. In any case, as may be observed, the synchronization executes at least partially during a time in which the first virtual processor is frozen and the first virtual machine nonetheless continues executing, using the second virtual processor, as referenced above with respect to operation 204.

Thereafter, the first virtual processor may be released, and execution of the first virtual machine may be resumed using both the first virtual processor and the second virtual processor (208). In this way, the first virtual machine 102 may continue normal operations, until a subsequent checkpoint trigger is received that initiates a subsequent incremental checkpoint.

Thus, the example of FIG. 2 merely illustrates generally that the system 100 of FIG. 1 is capable of providing an incremental checkpointing process in which the virtual machine 102 experiences a minimum of downtime. Specifically, as described, the virtual machine 102 continues operations during at least a portion of a current incremental checkpointing/synchronization process by freezing only those vCPUs which are required to be frozen as a result of having transmitted an I/O operation, while allowing remaining vCPUs to continue otherwise-normal operations of the virtual machine 102. In this regard, as referenced above, FIGS. 3, 4, 5 illustrate underlying technical techniques utilized by the system 100 of FIG. 1 to achieve such results.

Figure 3:
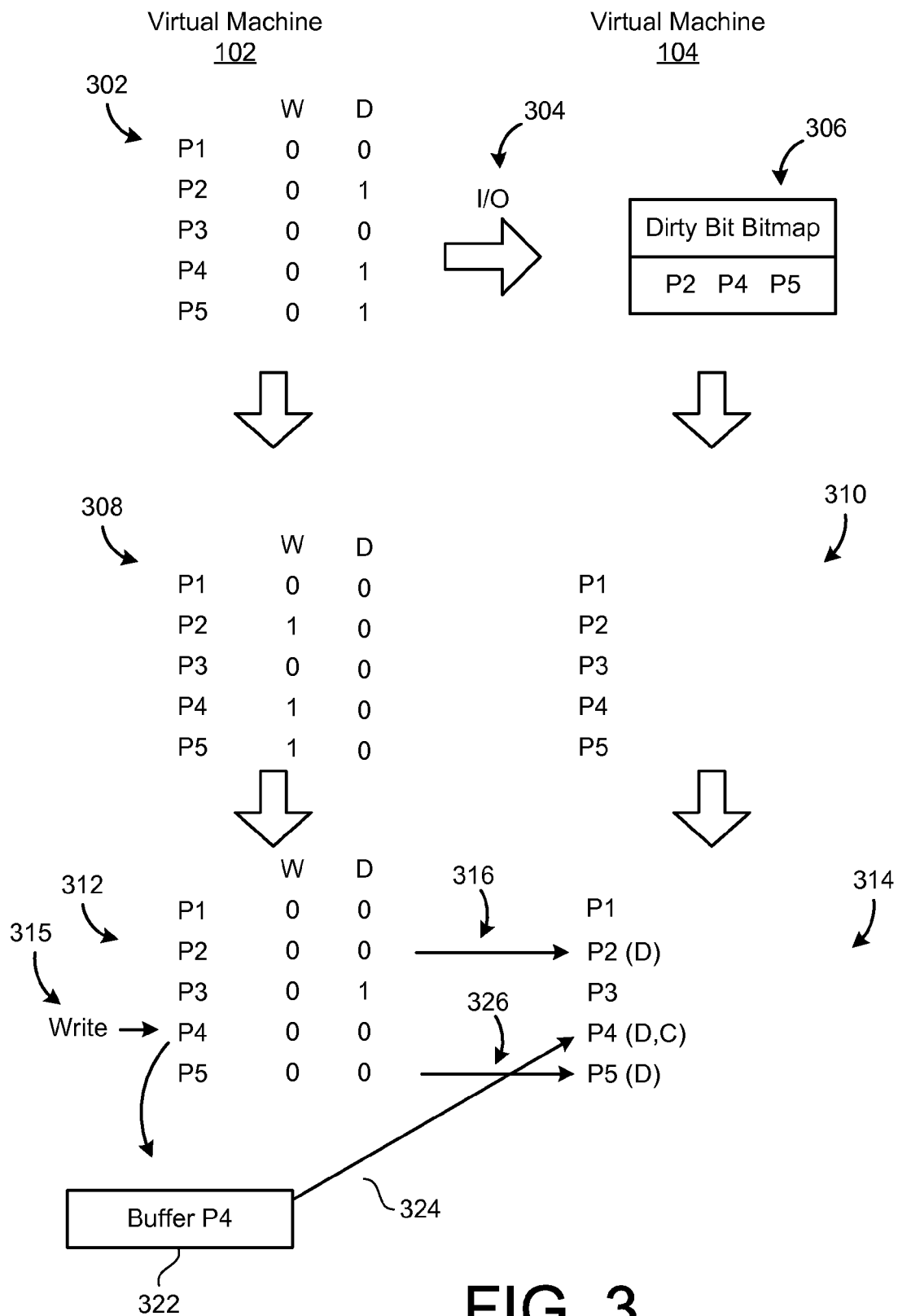
FIG. 3 illustrates memory pages being transferred using the system of FIG. 1.

Specifically, with respect to FIG. 3, the virtual machine 102 is illustrated as being associated with a first set 302 of memory pages P1, P2, P3, P4, P5. That is, FIG. 3 illustrates that, at a time immediately prior to execution of a current incremental checkpoint, the page table 122 of the checkpointing engine 116 may include a number of page entries for corresponding memory pages, represented by P1-P5 in the simplified example of FIG. 3. Further, as described above with respect to the page table manager 120 and the page table 122, each such page entry may be associated with a write control bit (illustrated and indicated as write control bit "W" in the example of FIG. 3), as well as a dirty bit (illustrated and indicated as dirty bit "D" in the example of FIG. 3).

In the simplified example of FIG. 3, it may be observed that the control bits for page entries P1, P3 are set to 0, indicating that, at that time, the corresponding memory pages have not been altered or dirtied since a most-recent incremental checkpoint, and that write permission is granted with respect to the corresponding memory pages. In contrast, it may be observed that the page entries P2, P4, P5 include dirty bits that have been flagged, indicating alteration of the corresponding memory pages in a time since the most-recent incremental checkpoint. Thus, it may be understood that a goal of the checkpoint process is to recreate exactly the corresponding snapshot of the set 302 of memory pages existing at a time of commencement of a current incremental checkpoint.

Thus, in the example of FIG. 3, it is assumed that an I/O operation 304 is detected, e.g., by the checkpoint trigger monitor 126 with respect to the vCPU 102b. Consequently, a recording of the relevant I/O operation may be transmitted to the virtual machine 104, along with a dirty bit bitmap 306, as shown. It is not specifically illustrated with respect to FIG. 3, but, as referenced above with respect to FIG. 1 and described in more detail below with respect to FIGS. 4, 5, the transmission of the I/O operation 304 and the dirty bit bitmap 306 may be executed in conjunction with transmission of relevant state information associated with the vCPUs 102a, 102b collected by the state monitor 124, and in conjunction with a temporary freezing of both vCPUs 102a, 102b by the pause manager 128. Rather, the focus of illustration of FIG. 3 is a manner in which the memory pages corresponding to the page entries P2, P4, P5 are identified and ensured of accurate and complete transfer thereof to the virtual machine 104.

Specifically, as shown, in conjunction with creation and transmission of the dirty bit bitmap 306 by the dirty bit bitmap generator 130, the page table manager 120 may be configured to reset the control bits W, D in the set 302 of page entries, resulting in a set 308 of modified page entries. As shown, such modifications by the page table manager 120 include setting of the write control bit "W" and clearing of the corresponding dirty bits "D." As a result, it may be appreciated that the memory pages associated with the page entries P2, P4, P5 of the set 308 are thus write-protected, and cannot be changed during operations of the virtual machine 102 without a prior clearing of the corresponding write control bit. Thus, as referenced above, the dirty bit bitmap 306 identifies relevant dirtied pages P2, P4, P5 to be transferred, and makes such information available at the virtual machine 104 (i.e., informs the transfer manager 136 of the checkpointing engine 118). Meanwhile, the modified set 308 of page entries provides the same identification of the identity of the dirtied memory pages, by way of setting of the write control bits of the page entries P2, P4, P5 (in addition to providing the actual, associated write protection of the underlying memory pages).

Once awareness of all relevant, dirtied memory pages is thus ensured with respect to both the virtual machine 102 and the virtual machine 104, the pause manager 128 may release the vCPU 102a, while continuing to maintain the vCPU 102b in a paused state. In this way, as described, operations of the virtual machine 102 may continue using the vCPU 102a, while the actual transfer of the dirtied memory pages corresponding to the page entries P2, P4, P5 is conducted.

In order to actually execute these transfers, the transfer manager 136 may utilize the memory-to-memory transfer engines 114, 115. Specifically, as described in more detail below, the transfer manager 136, in conjunction with the memory-to-memory transfer engine 115, may allocate a set 310 of memory pages. That is, empty memory pages may be identified and allocated by the transfer manager 136, and designated for receipt of transferred, dirtied memory pages.

In this regard, it may be appreciated that the set 310 includes the memory pages P1, P3, which may simply represent copies of corresponding memory pages P1, P3 at the virtual machine 102. As described, the corresponding pages are assumed to have been previously transferred during an earlier incremental checkpoint, and, since no alterations thereto have occurred in the meantime (as indicated by corresponding dirty bits being set to 0), it is not necessary to transfer these memory pages again.

Further in FIG. 3, sets 312 and 314 of memory pages at the first virtual machine 102 and the second virtual machine 104, respectively, illustrate an actual example process in which the dirtied memory pages corresponding to the page entries P2, P4, P5 are transmitted. Specifically, as shown, the transfer manager 136 may initially initiate transfer of the memory page corresponding to the page entry P2, as indicated by arrow 316. In the example, it is assumed that no attempt to write to the underlying memory page was made prior to transfer of the page P2 indicated by the arrow 316.

Consequently, the page P2 in the set 314 represents a copy of the dirtied version of the page P2 that existed within the set 302 at the time of the current incremental checkpoint. To reflect this correspondence, the page P2 within the set 314 is marked with the parenthetical (D), indicating that the page P2 therein is a duplicate of the dirtied version of the page P2 identified within the set 302.

In the example of FIG. 3, however, prior to execution of a similar transfer operation with respect to the memory page P4, it may occur that, as part of ongoing operations of the virtual machine 102 using the vCPU 102*a*, a write operation 318 is executed with respect to the memory page P4. Consequently, as described above with respect to FIG. 1, the copy-on-write manager 132 may be configured to execute a copy operation 320 in response to the requested write operation 318, in which a copy of the page P4 is stored within a buffer 322 (corresponding to the buffer 134 of FIG. 1). In this way, the version of the memory page P4 stored within the buffer 322 corresponds exactly to the dirtied memory page P4 existing in the set 302 and referenced within the dirty bit bitmap 306 in the set 308.

Consequently, the storage of the dirtied memory page P4 within the buffer 322 permits the page table manager 122 to clear the write control bit of the page entry P4 within the set 312, to thereby allow the write operation to proceed. As a result of the write operation, it will be necessary to transfer the resulting memory page P4 within a subsequent incremental checkpoint, so that, as shown, the dirty bit of the relevant page entry may be set to identify the memory page P4 as a dirtied memory page for purposes of the subsequent incremental checkpoint. As a result of these operations, the set 314 at the virtual machine 104 is illustrated as including the dirtied, copied version of the memory page P4, as indicated by the parenthetical (D, C) in the set 314.

In a final transfer operation in the simplified example of FIG. 3, the transfer manager 136 may execute a transfer 326 of the dirtied memory page P5, so as to thereby obtain a replicated version of the dirtied memory page at the virtual machine 104, as indicated by the memory page P5 parenthetical (D) within the set 314. In so doing, it may be observed that the set 314 provides the desired result, in which the included memory pages correspond exactly to the memory pages referenced with respect to the set 302.

Figure 4:
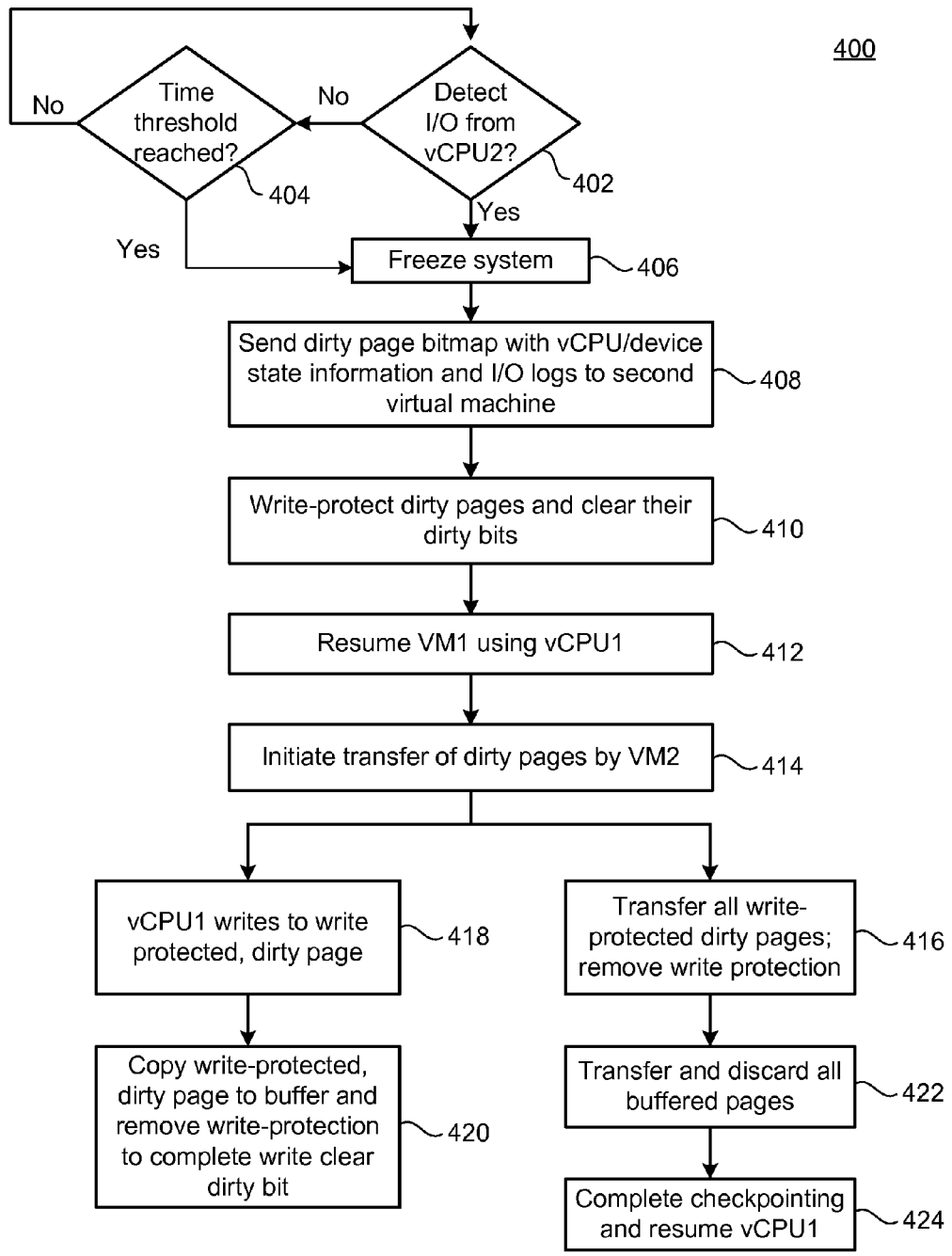
FIG. 4 is a flowchart illustrating more detailed example operations of the system of FIG. 1.

FIG. 4 is a flowchart 400 illustrating more detailed example operations of the system 100 of FIG. 1. More specifically, the flowchart 400 continues the simplified example in which, as illustrated in the example of FIG. 1, the first virtual machine 102 includes two vCPUs 102*a*, 102*b*, and the described checkpointing process occurs in the presence of a single I/O operation detected with respect to one of the two vCPUs, as already illustrated and described in part above with respect to FIG. 3. Of course, it may occur that multiple I/O operations are detected, as described below with respect to FIG. 6, and/or that three or more vCPUs are utilized, as described below with respect to FIG. 7.

In the example of FIG. 4, therefore, the process flow initially determines whether an I/O operation has been detected with respect to one of the vCPUs 102*a*, 102*b* (402). If not, then a determination of whether a predetermined time threshold has been reached may be made (404). As referenced, the use of such a time threshold may be advantageous, e.g., in order to prevent the occurrence of undesirably large gaps between checkpoints, such as may occur if I/O operations were the only checkpoint triggers utilized.

For the sake of example 4, and consistently with the example of FIG. 3, it is assumed that the vCPU 102*b* executes an I/O operation serving as the checkpoint trigger, and thereby causing the pause manager 128 to temporarily freeze operations of the virtual machine 102, including operations of both vCPUs 102*a*, 102*b* (406). Thereafter, the dirty bit bitmap generator 130 may generate the dirty bit bitmap 138, and the checkpointing engine 116 may thereafter transfer the dirty bit bitmap 138, state information gathered by the state monitor 124, and a recording of the I/O operation detected by the checkpoint trigger monitor 126 to the second virtual machine 104 (408).

In conjunction with this transfer, the page table manager 120 may modify corresponding page entries within the page table 122. Specifically, as described, the page table manager 120 may set a write control bit of each dirty page, thereby enabling write protection for each such page, while simultaneously clearing the dirty bits associated with each such page (410). Once completed, the pause manager 128 may be enabled to remove the pause established with respect to the vCPU 102*a*, thereby permitting resumption of operations of the virtual machine 102, using the vCPU 102*a* (412).

Thereafter, the transfer of identified dirty pages may be initiated by the second virtual machine 104 (414). For example, as described, the transfer manager 136 of the checkpointing engine 118 may utilize the memory-to-memory transfer engine 115 to copy memory pages from the virtual machine 102, by way of the memory-to-memory transfer engine 114.

Specifically, the transfer manager 136 may be responsible for allocating a page of RAM of the virtual machine 104 for each memory page to be copied, and thereafter may be responsible to send a message over the relevant network, requesting that the checkpointing engine 116, in conjunction with the memory-to-memory transfer engine 114, perform a copy of the requested memory page directly to the newly-created page address within the memory of the virtual machine 104.

Upon reception of this message, the checkpointing engine 116, in conjunction with the memory-to-memory transfer engine 114, may execute a write operation (e.g., an RDMA write) directly to the provided memory location in the remote system of the virtual machine 104. It may be appreciated from the above, that such a copy process using the memory-to-memory transfer engines 114, 115 may be executed with respect to dirty memory pages transferred directly from the V RAM 102*c* of the virtual machine 102, as well as with respect to copied memory pages stored within the buffer 134 by the copy-on-write manager 132.

Specifically, as shown in FIG. 4, the initiated transfer of dirty pages may proceed with the transferring of all write-protected dirty pages, whereupon, as described, a successful transfer of such a write protected dirty page will also be associated with removal of the write protection bit in the associated page entry within the page table 122 (416). Since such transfers will occur in parallel with continuing operations of the first virtual machine 102 using the vCPU 102*a*, it may also occur that the virtual machine 102 attempts to perform a write operation with respect to one of the write protected dirty pages that has not yet been transferred (418). In such cases, the write protected dirty page may be copied by the copy-on-write manager 132 to the buffer 134, and the page table manager 120 may thereafter proceed to remove the write protection bit for the page in question so as to thereby permit completion of the desired write operation in conjunction with enabling dirty bit tracking with respect to any future operations of the virtual machine 102 with respect to the memory page in question, in advance of a subsequent incremental checkpoint (420).

All such buffered, copied pages may thereafter be transferred, using the processes just described with respect to the memory-to-memory transfer engines 114, 115, and may thereafter be discarded as no longer being useful or necessary to retain in memory (422). Once all write protected, dirty pages have either been transferred, directly or by way of the buffer 134, the checkpointing process may be completed (424). Accordingly, the vCPU 102b may be released, so that the virtual machine 102 may continue normal operations until a time of the next incremental checkpoint.

Figure 5:
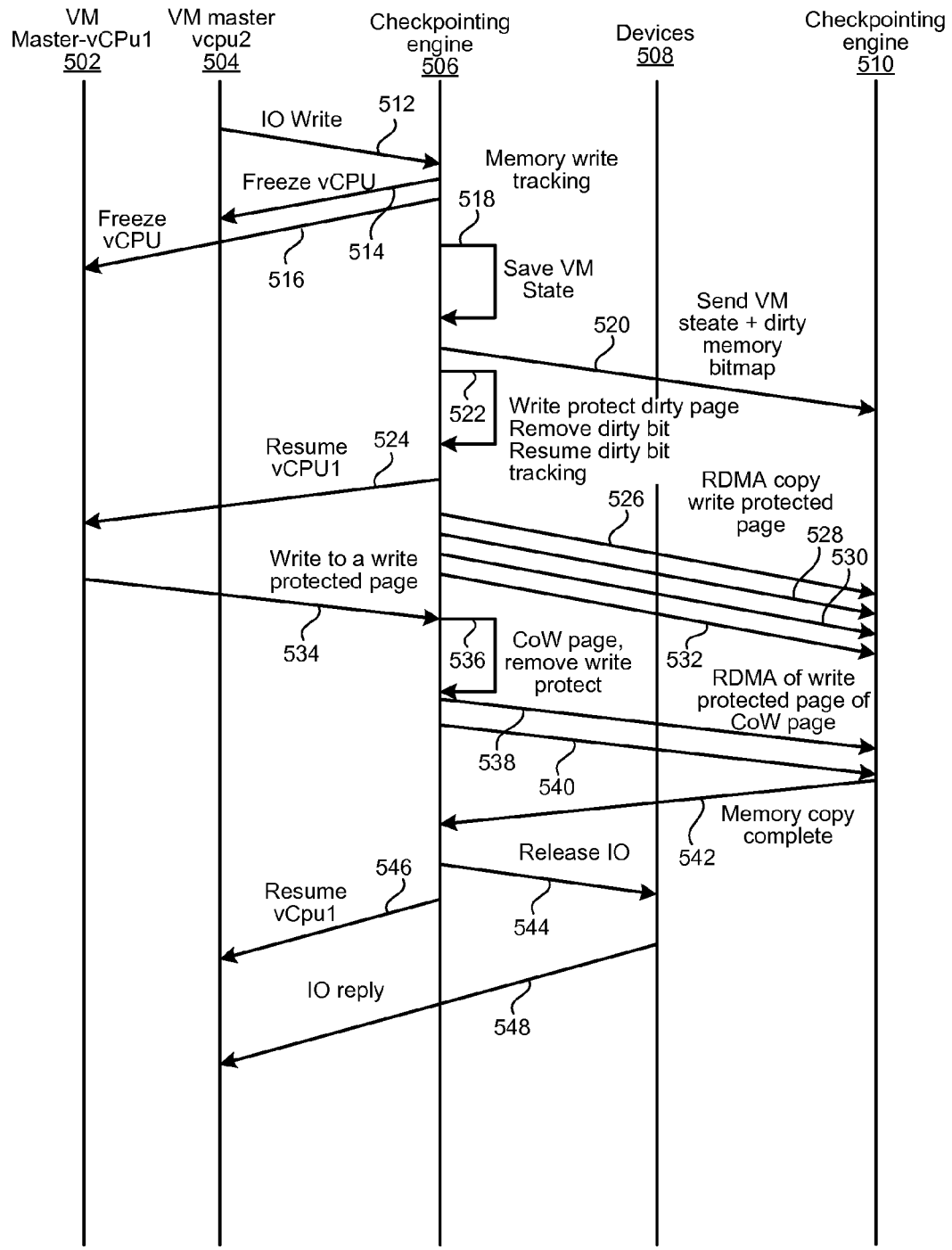
FIG. 5 is a first timing diagram illustrating first example operations of the system of FIG. 1.

FIG. 5 is a timing diagram illustrating essentially the same scenario just described above with respect to FIGS. 3 and 4, but illustrating an example timing of the various operations with respect to one another, while illustrating locations of the associated intra-device and intra-device operations/communications. Thus, FIG. 5 provides an example in which the first vCPU 502 of a source virtual machine operates in parallel with the second vCPU 504 of the source virtual machine, and locally with a source checkpointing engine 506. Devices 508 represent external devices, such as may interact with one or both vCPUs of the source virtual machine in the context of an I/O operation. Meanwhile, a checkpointing engine 510 represents the checkpointing engine 118 of FIG. 1 located at the remote destination location of the second virtual machine.

Thus, in the example of FIG. 5, an I/O write operation 512 is initiated at the vCPU 504, and intercepted by the checkpointing engine 506. The checkpointing engine 506 thereafter freezes both the vCPU 504 (514) and the vCPU 502 (516).

The checkpointing engine 506 may then save a current state of the source virtual machine (518), and may thereafter transmit the virtual machine state information along with the dirty bit bitmap and recording of the I/O write operation (520). The checkpointing engine 506 may also, for each dirty page identified within the dirty bit bitmap, write protect the page, remove the dirty bit, and resume dirty bit tracking (522). Thereafter, the checkpointing engine 506 may release the vCPU 502 for resumption of operations thereof and enabling operations of the source virtual machine (524).

Thereafter, an RDMA copy of all such write protected pages may proceed (526, 528, 530, 532) until an attempt is made by the vCPU 502 to write to a write protected page (534). At that time, the write protected page may be copied to a local buffer of the checkpointing engine 506, (e.g., the buffer 134), and the write protection of the page in question may be removed (536). Consequently, RDMA copies of such write protected/copy-on-write pages may continue (538, 540).

Once the copying of all dirtied memory pages is complete (542), the original I/O operation of the vCPU 504 may be released for completion thereof and receipt thereof at the device 508 (544). The checkpointing engine 506 may also then resume operations of the vCPU 504 (546). Consequently, the vCPU 504 will be available to receive an I/O reply from the device 508 (548).

In FIG. 5, it is assumed that only the single I/O write operation (512) is executed during the incremental checkpoint in question. However, as referenced above, and as may be apparent from the fact that the source virtual machine (e.g., the first virtual machine 102) continues operations using one or more available vCPUs, one or more of such vCPUs may also execute an I/O operation during a time of execution of a current incremental checkpoint. In such scenarios, a nested version of the operations already described with respect to FIGS. 3-5 may be executed. In other words, a sub-incremental checkpoint may be created for the second I/O operation detected with respect to the second vCPU.

Figure 6:
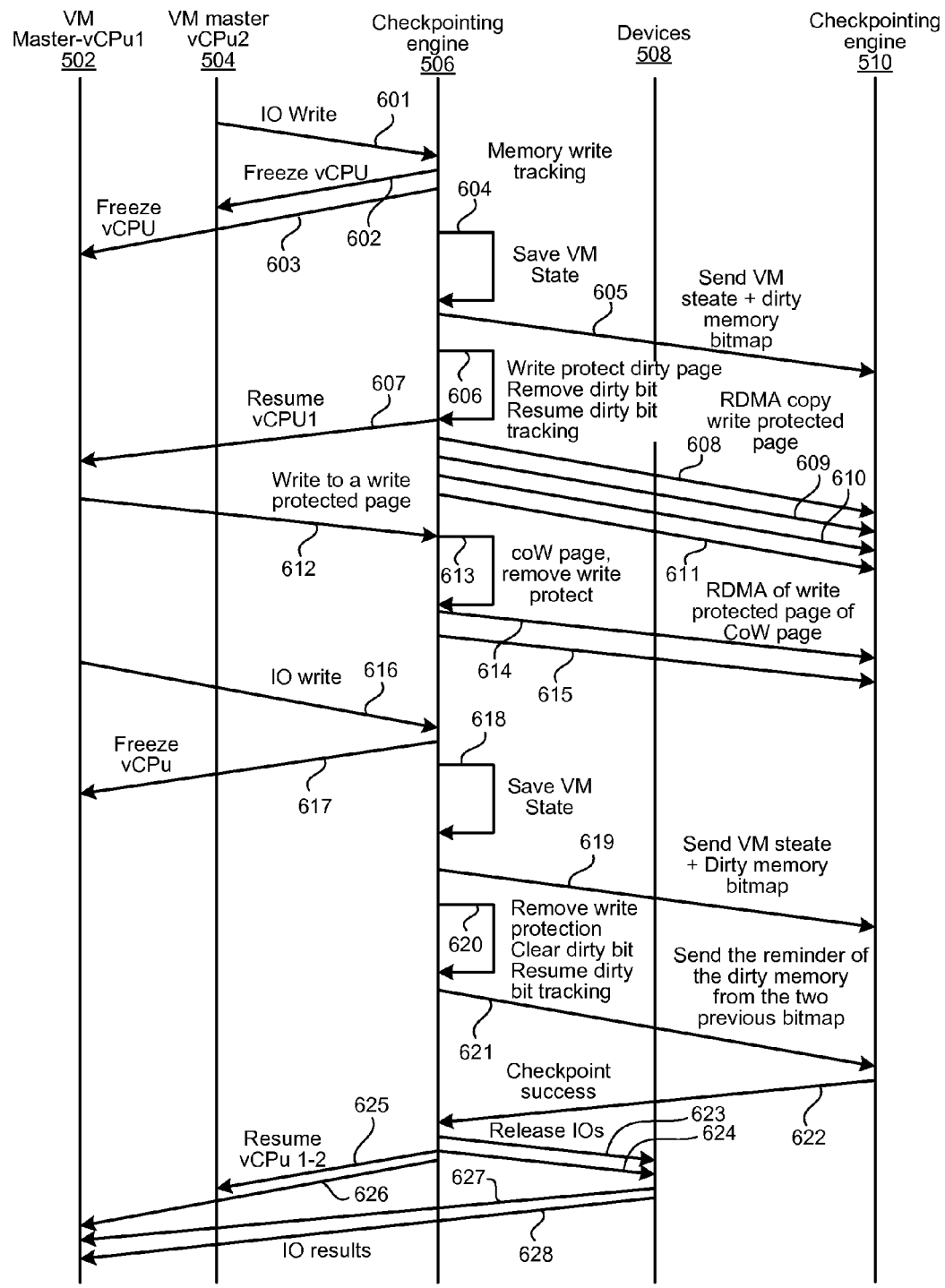
FIG. 6 is a second timing diagram illustrating second example operations of the system of FIG. 1.

Thus, FIG. 6 begins substantially the same operations as described and illustrated above with respect to FIG. 5. That is, as shown, an I/O write operation (601) occurs, which results in the freezing (602, 603) of the vCPUs 502, 504. Once the virtual machine state of the source virtual machine is saved (604), then the state information, dirty bit bitmap, and I/O recording may be transmitted to the checkpointing engine 510 (605).

After write protecting each identified dirty page, removing corresponding dirty bits, and permitting the resumption of dirty bit tracking for each such page (606), operations of the first vCPU 502 may continue (607). Thereafter, the RDMA copy process for write protected, dirty pages may commence (608, 609, 610, 611).

Thereafter, if an attempt to write to a write protected page is made (612), then the relevant page may be copied to the available buffer in conjunction with removal of the write protection (and enabling of dirty bit tracking) for that page (613). Thereafter, the RDMA copy of any such buffered pages may proceed in conjunction with remaining transfers of remaining write protected pages (614, 615).

Thereafter, in the example of FIG. 6, and in contrast to the example of FIG. 5, an additional I/O write operation is received from the remaining operational vCPU 502 (616). Thereafter, the originating vCPU 502 may be frozen (617). Subsequent operations reflect previous operations made in conjunction with the operations just described.

Specifically, as shown, the state of the source virtual machine may be saved (618), and thereafter sent along with a current dirty bit bitmap and recording of the triggering I/O write operation to the checkpointing engine 510 (619). That is, with respect to the dirty bit bitmap being transferred, it may be appreciated that dirty bit tracking for all pages without write protection (including both the memory pages that had not been dirtied since the last incremental checkpoint, as well as the write protected pages whose write protections were removed in conjunction with their transfer/copy) may be included, so that additional dirtied pages may need to be transferred, as reflected in the newly-transmitted dirty bit bitmap. Put another way, inasmuch as the source virtual machine has continued operating during the current incremental checkpoint, it may be appreciated that the checkpoint initiated by the I/O write operation of the vCPU 502 (615) simply initiates a subsequent checkpoint, so that, as with any such checkpoint, pages dirtied since a most-recent checkpoint (which, in this case, is the current or ongoing checkpoint) must be transferred for storage at the destination virtual machine.

In the example of FIG. 6, it is assumed that only the two vCPUs 502, 504 are present. Consequently, it is not possible for the corresponding source virtual machine to continue operation, and therefore not necessary to provide write protection for the dirtied pages identified within the updated dirty bit bitmap. Consequently, any such write protection may be cleared in conjunction with the clearing of associated dirty bits and resumption of dirty bit tracking (620). Thereafter, any remainder of dirtied memory pages may be transferred, using the two available dirty bit bitmaps (621). Again, it is not necessary to execute the copy-on-write functionalities in conjunction with the associated buffer at this point, because no write operations are ongoing.

Once the checkpoint has successfully completed (622), the two triggering I/O write operations (601, 615) may be released (623, 624) to the one or more devices 508, and operations of the vCPUs 502, 504 may be resumed (625, 626). As a result, any results received from the device 508 may be received at the corresponding vCPUs 502, 504 (627, 628).

Figure 7:
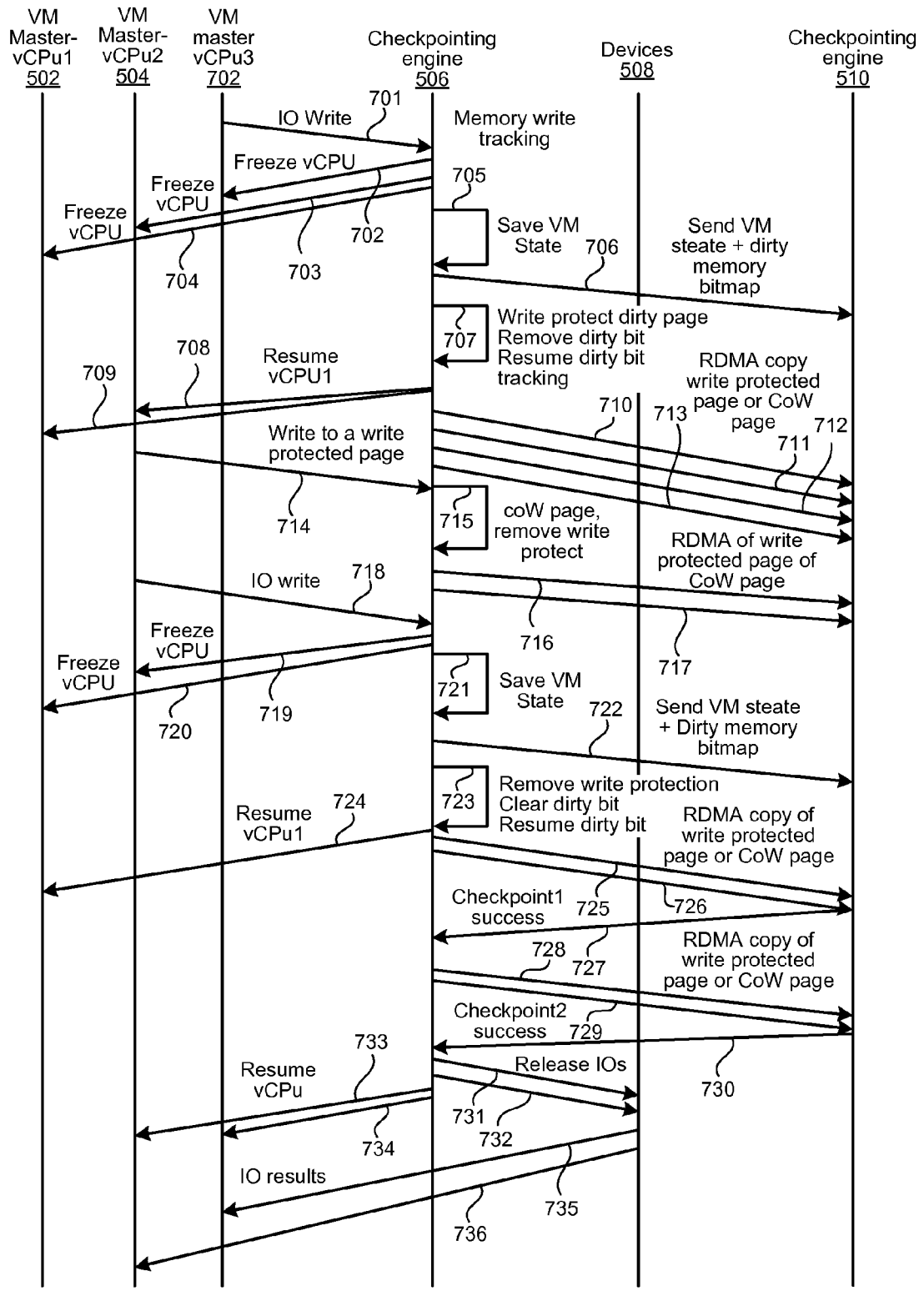
FIG. 7 is a third timing diagram illustrating example operations of a third example implementation of the system of FIG. 1.

FIG. 7 is a timing diagram illustrating a final example implementation of the system 100 of FIG. 1, in which at least three vCPUs are utilized, so that, in addition to the vCPUs 502, 504 referenced above with respect to FIGS. 5 and 6, a third vCPU 505 is illustrated. In the example of FIG. 7, operations 701-717 are illustrated which correspond substantially to corresponding operations of FIGS. 5 and 6, and which are therefore not described here in detail.

However, it may be generally observed that, in the example, the third vCPU 505 issues an I/O write operation (701) that results in a freezing of all three available vCPUs (702, 703, 704). Thereafter, state information for the source virtual machine may be saved (705), and sent to the checkpointing engine 510 along with a corresponding dirty bit bitmap and any information regarding the I/O operation (706).

Write protection for the identified dirty pages may be provided at the checkpointing engine 506, in conjunction with removal of corresponding dirty bits and resumption of available dirty bit tracking (707). Consequently, at this point, resumption of vCPUs 502, 504 may be permitted (708, 709). In this scenario, it may be observed that operations of the source virtual machine may thus proceed using both the vCPUs 502, 504. In such scenarios, it may be presumed that such operations may proceed in a manner that more closely matches otherwise-normal operations of the source virtual machine, since, in the example of FIG. 7, two out of three vCPUs are available, as compared to the examples of FIGS. 5 and 6 in which only one out of two vCPUs are available.

RDMA copies of write-protected pages may then proceed (710, 711, 712, 713). If a write attempt is made with respect to one of the write protected pages (714), then the page in question may be copied to the available buffer in conjunction with removal of the write protection of that page (715). Thereafter, as described, RDMA copies of remaining write protected and/or copied pages may continue (716, 717).

In the example of FIG. 7, similarly to the example of FIG. 6, a second I/O write operation (718) is detected, thereby causing the freezing of vCPUs 502, 504 (719, 720). Again, a current state of the source virtual machine may be saved (721) and sent along with the updated dirty bit bitmap and any necessary I/O information to the checkpointing engine 510 (722). In conjunction therewith, write protection may be issued for identified dirty pages, while the dirty bits are removed and dirty bit tracking has resumed (723).

In contrast with the example of FIGS. 5 and 6, a third vCPU remains available for use, so that, accordingly, the vCPU 502 is resumed (724) for use in supporting otherwise-normal operations of the source virtual machine. At this time, it may be observed that any or all speed of operations of the source virtual machine may be reduced. However, nonetheless, the source virtual machine may continue operations in at least a reduced manner, thereby providing a convenience to any users thereof, in minimizing total downtime of the source virtual machine. Moreover, it may be appreciated that implementations of the system 100 may include four or more of these vCPUs, so that, depending on various related factors, operations of the virtual machine in question may continue at acceptable levels, even when several vCPUs are frozen for inclusion in an associated checkpoint process.

In the example of FIG. 7, the RDMA copy of write protected and/or copied pages may continue (725, 726), until, in the example, the first-initiated checkpoint process successfully completes (727). At this time, the RDMA copy of remaining write protected or copied pages may continue (728, 729), until the second checkpoint successfully completes (730).

The I/O operations (701, 718) may thus be released (731, 732). Consequently, the vCPUs 504, 505 may be resumed to support operations of the source virtual machine (733, 734). In conjunction therewith, results of the I/O operations (701, 718) may be received at corresponding ones of the previously-frozen vCPUs 504, 505 (735, 736).

Thus, the techniques described above with respect to FIGS. 1-7 allow a virtual machine and associated systems to checkpoint with minimal disruptions. As described, by overlapping the various checkpointing mechanisms with the actual operations of the underlying virtual machines, disruption of the overall system is greatly minimized. Moreover, such techniques allow a transparent packing and release of I/O operations.

Figure 8:
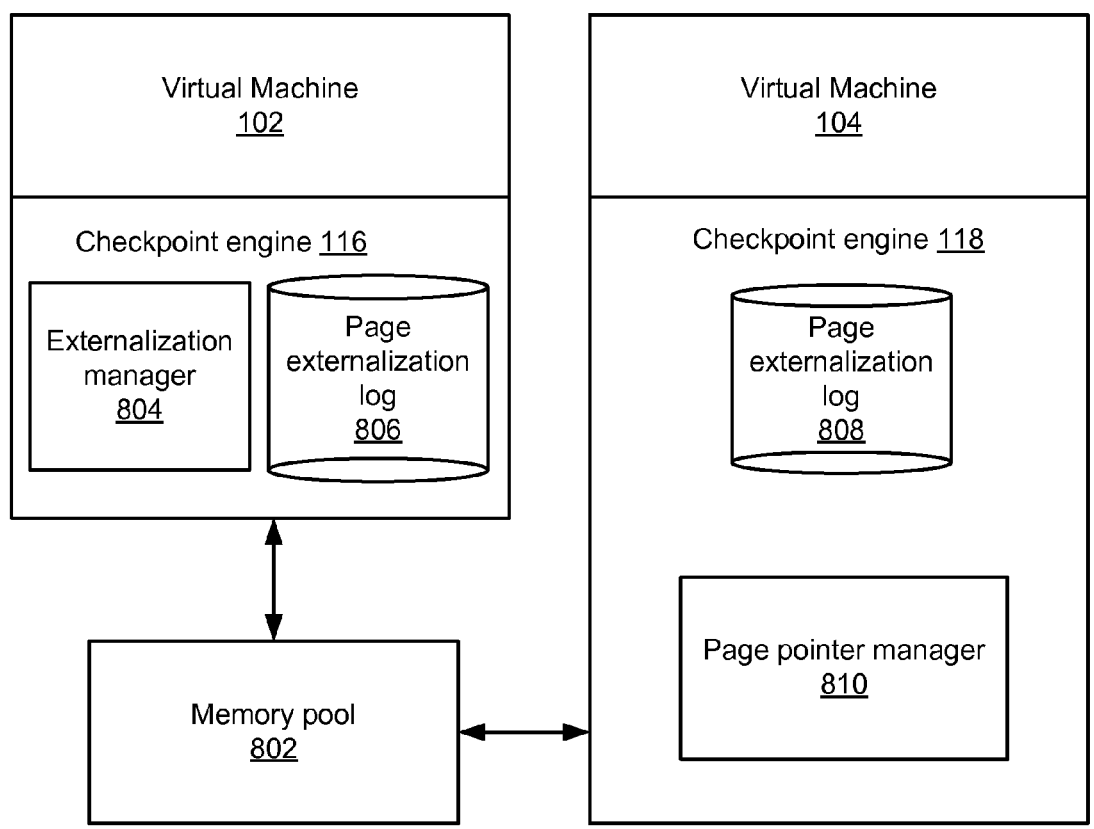
FIG. 8 is a block diagram of an example implementation of the system of FIG. 1 that utilizes an external fault tolerant system.

FIG. 8 is a block diagram of a system 800, which is an example implementation of the system 100 of FIG. 1 in which an external fault tolerant system is used to reduce an active working set of the system 100. Specifically, as described above with respect to FIG. 7, the various checkpoint processes may involve the transfer and/or copy of a large number of memory pages, perhaps in conjunction with relatively frequent and ongoing write operations to such memory pages.

In the example of FIG. 8, an external memory pool 802 is utilized to reduce an active working set of memory pages to be checkpointed. Moreover, as described in detail below, the external memory pool 802 provides effective fault tolerance, which may be particularly suitable for the types of cloud-based environments referenced above with respect to FIG. 1.

In the example of FIG. 8, the external memory pool 802 may represent virtually any external, fault tolerant memory system. For example, such a system may include a number of nodes representing separate, physical memories. However, it may be appreciated that any suitable external memory system may be used that is compatible with the techniques described herein.

In the example of FIG. 8, the checkpoint engine 116 includes an externalization manager 804 that is configured to externalize selected memory pages for storage using the memory pool 802. Further, a page externalization log 806 is available to the externalization manager 804, and may be used to keep a log of each such page externalization since a most-recent successful checkpoint.

In this context, it may be observed that the externalization manager 804 may use the external memory pool 802 in a number of potential contexts. For example, in general, the externalization manager 804 may be utilized by the virtual machine 102 to conserve local memory of the virtual machine 102. For example, the memory pool 802 may be implemented using relatively inexpensive and available memory, thereby reducing a total cost of ownership of the virtual machine 102. Moreover, the memory pool 802 may provide redundant, fault tolerant storage of designated, externalized memory pages with the virtual machine 102.

In the context of the checkpointing techniques described herein, it may be observed that any such pages designated for transfer to the virtual machine 104 may instead be stored using the memory pool 802. For example, memory pages to be transferred may already have been externalized to the memory pool 802, e.g., as part of an earlier checkpoint process, or as part of some other externalization operations. Additionally, memory pages to be transferred during a checkpoint process may be externalized to the memory pool 802 as part of that process.

Regardless of when or why the memory pages are transferred to the memory pool 802, it may be observed that the checkpoint engine 118 may access desired memory pages directly from the memory pool 802. In so doing, resources associated with copying and transferring memory pages between the virtual machines 102 and 104 may be conserved. That is, for example, both checkpoint engines 116, 118 may simply access a given page from within the memory pool 802, without necessarily copying/transferring all memory pages as would otherwise be required by the checkpoint processes described above.

Through the use of the page externalization log 806 and related techniques, as described herein, the checkpoint engine 116 may advantageously leverage the availability of the memory pool 802, while avoiding difficulties that might otherwise be associated with attempts to incorporate the memory pool 802 into the checkpointing techniques described above with respect to FIGS. 1-7.

For example, if the memory pool 802 were in use in the simplified examples of FIGS. 1-7, and the checkpoint engine 118 were to initiate memory-to-memory transfer of a specific memory page identified by the appropriate dirty bit bitmap generator, as described above, it may occur that the desired memory page has, in the meantime, been externalized to the memory pool 802. Moreover, it is possible that other systems may have access to memory pages in the memory pool 802, so that memory pages externalized to the memory pool 802 may be altered while contained therein.

In order to address these and related issues, while incorporating use of the memory pool 802, the externalization manager 804 may keep the page externalization log 806, including a log of every page externalized to the memory pool 802 since a most-recent successful checkpoint. The externalization manager 804 may be configured to remove any entry of an externalized page from the page externalization log 806, in the event that the page in question is internalized back to the virtual machine 102 prior to a beginning of a next incremental checkpoint. Further, all memory pages which are internalized from the memory pool 802 may be marked as dirty pages (e.g., the page table manager 120 may set a dirty bit of the memory page accordingly within the corresponding page entry of the page table 122).

Thus, in operation, when a current incremental checkpoint is triggered, in addition to sending the state information and dirty bit bitmap and I/O operation information referenced above, the page externalization log 806 may be provided for storage as page externalization log 808 within the checkpoint engine 118. Then, when the checkpoint engine 118 requests a memory page for the current checkpoint, a page pointer manager 810 may first check for inclusion of the page in question within the page externalization log 808. If the memory page is present therein, the page pointer manager 810 may simply mark a page table entry for the memory page in question to point to the corresponding externalized location within the memory pool 802, and may thereby avoid actually transferring a copy of the memory page.

Once all memory pages that have been dirtied have been thus-identified or otherwise copied for the checkpoint, the checkpoint engine 118 may then scan the page externalization log 808, and delete any memory pages from within the memory of the virtual machine 104 that have a matching entry within the memory pool 802, since such pages would now be redundant thereto. Thereafter, the checkpoint engine 118 may notify checkpoint engine 116 of successful completion of the checkpointing operation. It may be observed that copies of memory pages stored by the copy on write manager 132 using the buffer 134 need not be externalized, since such pages are short-lived, and are discarded during each checkpoint operation.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   at least one processor; and
   a non-transitory computer-readable storage medium storing instructions
   executable by the processor, the system further including
   a checkpointing engine configured to cause the at least one processor to execute a synchronization of a first virtual machine with a second virtual machine, the first virtual machine being executed with at least a first virtual processor and a second virtual processor, the synchronization including transferring memory pages of the first virtual machine for storage by the second virtual machine, the checkpointing engine including
   a checkpoint trigger monitor configured to cause the at least one processor to receive a checkpoint trigger initiating the synchronization;
   a pause manager configured to cause the at least one processor to pause the first virtual processor while allowing the first virtual machine to continue executing, using the second virtual processor, during at least a portion of the synchronization;
   a page table manager configured to cause the at least one processor to track, within a page table, a page entry for each memory page of the first virtual machine, the page entries each including a write control bit and a dirty bit;
   a dirty bit bitmap generator configured to cause the at least one processor to generate, based on the page table, a dirty bit bitmap for transmission to, and use by, the second virtual machine, the dirty bit bitmap identifying dirty memory pages of the first virtual machine altered since a most-recent synchronization, based on the corresponding dirty bits, wherein the page table manager is configured to clear the corresponding dirty bits and set corresponding write control bits for write protection, in conjunction with the generation of the dirty bit bitmap; and
   a copy-on-write manager configured to cause the at least one processor to detect, during the synchronization, a write request for one of the identified dirty memory pages that has not yet been transferred to the second virtual machine, and to copy the identified dirty memory page to a temporary buffer for transferring therefrom to the second virtual machine;
   wherein the pause manager is configured to release the first virtual processor and resume execution of the first virtual machine, using the first virtual processor and the second virtual processor, once all of the identified dirty memory pages have been provided to the second virtual machine.

2. The system of claim 1, wherein the checkpoint trigger includes a detected input/output (I/O) operation of the first virtual processor.

3. The system of claim 2, wherein the checkpoint trigger monitor is configured to cause the at least one processor to detect a second checkpoint trigger during the synchronization, the second checkpoint trigger including an I/O operation of the second virtual processor.

4. The system of claim 3, wherein the pause manager is configured to pause the first virtual processor and the second virtual processor in response to the second checkpoint trigger, and the dirty bit bitmap generator is configured to generate a second dirty bit bitmap based on dirtied pages resulting from the continued executing of the first virtual machine using the second virtual processor, during the at least the portion of the synchronization.

5. The system of claim 4, wherein the first virtual machine includes at least a third virtual processor, and the first virtual machine continues executing using the third virtual processor while the first virtual processor and the second virtual processor are paused.

6. The system of claim 1, wherein the pause manager is configured to cause the at least one processor to pause the first virtual processor and the second virtual processor at a beginning of the synchronization and in response to the checkpoint trigger, and wherein the checkpointing engine includes a state monitor configured to capture, for transmission to the second virtual machine, state information of the first virtual processor and the second virtual processor.

7. The system of claim 1, wherein the transferring of the memory pages is initiated by a memory-to-memory transfer engine of the second virtual machine, based on the dirty bit bitmap, and the system further comprises a memory-to-memory transfer engine configured to transfer identified memory pages from a virtual memory of the first virtual machine to a virtual memory of the second virtual machine, by way of the memory-to-memory transfer engine of the second virtual machine.

8. The system of claim 1, wherein the page table manager, in conjunction with the copying of the identified dirty memory pages to the temporary buffer by the copy-on-write manager, clears the corresponding write control bits and enables dirty bit tracking with respect to the copied, identified dirty memory pages.

9. The system of claim 1, wherein the checkpointing engine includes an externalization manager configured to externalize at least some of the memory pages of the first virtual machine for storage using an external memory pool, the externalization manager being configured to maintain an externalization log tracking the externalizations and provide the externalization log to the second virtual machine.

10. A computer-implemented method for executing instructions stored on a computer readable storage medium, the method comprising:
    receiving a checkpoint trigger initiating a synchronization of a first virtual machine with a second virtual machine;
    tracking, within a page table, a page entry for each memory page of the first virtual machine, the page entries each including a write control bit and a dirty bit; and
    generating, based on the page table, a dirty bit bitmap for transmission to, and use by, the second virtual machine, the dirty bit bitmap identifying dirty memory pages of the first virtual machine altered since a most-recent synchronization, based on the corresponding dirty bits;
    clearing the corresponding dirty bits;
    setting corresponding write control bits for write protection, in conjunction with the generation of the dirty bit bitmap;
    detecting, during the synchronization, a write request for one of the identified dirty memory pages that has not yet been transferred to the second virtual machine; and copying the identified dirty memory page to a temporary buffer for transferring therefrom to the second virtual machine.

11. The method of claim 10, wherein the checkpoint trigger includes a detected input/output (I/O) operation of a first virtual processor of the first virtual machine.

12. The method of claim 10, wherein the first virtual machine is executed with at least a first virtual processor and a second virtual processor, the method further comprising:
pausing the first virtual processor while allowing the first virtual machine to continue executing, using the second virtual processor;
executing the synchronization, including transferring memory pages of the first virtual machine for storage by the second virtual machine; and
releasing the first virtual processor and resuming execution of the first virtual machine, using the first virtual processor and the second virtual processor.

13. A computer program product, the computer program product being tangibly embodied on a non-transitory computer-readable storage medium and comprising instructions that, when executed, are configured to:
receive a checkpoint trigger initiating a synchronization of a first virtual machine with a second virtual machine, the first virtual machine being executed with at least a first virtual processor and a second virtual processor;
track, within a page table, a page entry for each memory page of the first virtual machine, the page entries each including a write control bit and a dirty bit; and
generate, based on the page table, a dirty bit bitmap for transmission to, and use by, the second virtual machine, the dirty bit bitmap identifying dirty memory pages of the first virtual machine altered since a most-recent synchronization, based on the corresponding dirty bits;
clear the corresponding dirty bits;
set corresponding write control bits for write protection, in conjunction with the generation of the dirty bit bitmap;
detect, during the synchronization, a write request for one of the identified dirty memory pages that has not yet been transferred to the second virtual machine; and
copy the identified dirty memory page to a temporary buffer for transferring therefrom to the second virtual machine.

14. The computer program product of claim 13, wherein the checkpoint trigger includes a detected input/output (I/O) operation of the first virtual processor.

15. The computer program product of claim 14, wherein the instructions, when executed, are further configured to:
detect a second checkpoint trigger during the synchronization, the second checkpoint trigger including an I/O operation of the second virtual processor;
pause the first virtual processor and the second virtual processor in response to the second checkpoint trigger; and
generate a second dirty bit bitmap based on dirtied pages resulting from the continued executing of the first virtual machine using the second virtual processor, during the at least the portion of the synchronization.

16. The computer program product of claim 14, wherein the first virtual machine includes at least a third virtual processor, and the first virtual machine continues executing using the third virtual processor while the first virtual processor and the second virtual processor are paused.

17. The computer program product of claim 14, wherein the instructions, when executed, are further configured to:
externalize at least some of the memory pages of the first virtual machine for storage using an external memory pool,
maintain an externalization log tracking the externalizations; and
provide the externalization log to the second virtual machine.

18. The computer program product of claim 13, wherein the instructions, when executed, are further configured to:
pause the first virtual processor while allowing the first virtual machine to continue executing, using the second virtual processor;
execute the synchronization, including transferring memory pages of the first virtual machine for storage by the second virtual machine; and
release the first virtual processor and resuming execution of the first virtual machine, using the first virtual processor and the second virtual processor.

* * * * *